US011797962B2

(12) United States Patent
Jones et al.

(10) Patent No.: US 11,797,962 B2
(45) Date of Patent: Oct. 24, 2023

(54) CONFIGURING DATA TRANSFERS BASED ON ELECTRONIC MESSAGES

(71) Applicant: The Toronto-Dominion Bank, Toronto (CA)

(72) Inventors: Christopher Mark Jones, Villanova, PA (US); Marc Chalifoux, Toronto (CA); Sara Knechtel, Philadelphia, PA (US)

(73) Assignee: The Toronto-Dominion Bank, Toronto (CA)

( * ) Notice: Subject to any disclaimer, the term of this patent is extended or adjusted under 35 U.S.C. 154(b) by 836 days.

(21) Appl. No.: 16/435,967

(22) Filed: Jun. 10, 2019

(65) Prior Publication Data

US 2020/0387878 A1 Dec. 10, 2020

(51) Int. Cl.
| | | |
|---|---|---|
| G06Q 20/14 | (2012.01) | |
| G06Q 40/02 | (2023.01) | |
| G06F 21/31 | (2013.01) | |
| G06Q 30/04 | (2012.01) | |
| G06Q 10/107 | (2023.01) | |

(52) U.S. Cl.
CPC .............. *G06Q 20/14* (2013.01); *G06F 21/31* (2013.01); *G06Q 10/107* (2013.01); *G06Q 30/04* (2013.01); *G06Q 40/02* (2013.01)

(58) Field of Classification Search
None
See application file for complete search history.

(56) References Cited

U.S. PATENT DOCUMENTS

| | | |
|---|---|---|
| 8,311,942 B1 | 11/2012 | Mason |
| 2003/0177090 A1 | 9/2003 | Eden |
| 2004/0225609 A1* | 11/2004 | Greene ................ G06Q 30/04 |
| | | 705/40 |
| 2006/0031333 A1* | 2/2006 | O'Neill ............... G06Q 10/107 |
| | | 709/206 |

(Continued)

FOREIGN PATENT DOCUMENTS

WO WO2019010584 A1 1/2019

OTHER PUBLICATIONS

Biersdorfer, "How Google Knows When Your Bills Are Due", New York Times, Nov. 28, 2016 (Year: 2016).*

*Primary Examiner* — Abdulmajeed Aziz
(74) *Attorney, Agent, or Firm* — Rowand LLP

(57) ABSTRACT

Configuring data transfers based on electronic messages. A system includes a communication module, a processor, and a memory. The memory stores instructions that, when executed, configure the processor to: receive, from a client device, an authentication credential and associate the authentication credential with a client record. The processor identifies, based on delegated access to query a message account at a message server, a resource request message associated with the message account using a defined criteria. The processor obtains, based on the resource request message, a resource parameter to define a proposed resource transfer to a recipient entity. The processor generates and transmits, to the client device, a transfer request alert based on the proposed resource transfer for display at the client device. In response to receiving, from the client device, a selection of a selectable option, the processor allocates a resource to the recipient entity.

9 Claims, 8 Drawing Sheets

(56) References Cited

U.S. PATENT DOCUMENTS

| | | | |
|---|---|---|---|
| 2011/0251952 A1* | 10/2011 | Kelly | G06Q 20/102 |
| | | | 705/40 |
| 2013/0085936 A1* | 4/2013 | Law | H04L 12/1471 |
| | | | 705/40 |
| 2014/0244453 A1* | 8/2014 | Rephlo | G06Q 40/12 |
| | | | 705/30 |
| 2016/0034953 A1 | 2/2016 | Wall et al. | |
| 2016/0125408 A1* | 5/2016 | Crawford | G06Q 20/102 |
| | | | 705/34 |
| 2017/0109178 A1* | 4/2017 | Chen | G06F 9/451 |
| 2017/0228808 A1 | 8/2017 | Kumar et al. | |
| 2018/0205741 A1 | 7/2018 | Roussos et al. | |
| 2018/0285982 A1 | 10/2018 | Pai | |
| 2019/0012674 A1 | 1/2019 | Wiseman et al. | |
| 2020/0034813 A1* | 1/2020 | Calinog | G06Q 20/065 |
| 2020/0210377 A1* | 7/2020 | Struck | G06V 30/416 |
| 2021/0182811 A1* | 6/2021 | Bardouille | G06Q 20/3676 |

* cited by examiner

CONFIGURING DATA TRANSFERS BASED ON ELECTRONIC MESSAGES

TECHNICAL FIELD

The present application relates to data transfers and, in particular, to configuring data transfers based on electronic messages.

BACKGROUND

The concept of receiving goods or rendering services in exchange for a resource, such as money, currency, tokens, assets, or the like, finds application in a number of fields. A goods/services provider may generate and transmit, to a consumer, an invoice for the provided goods/services. In some examples, invoices may be uploaded to an online website portal of the goods/services provider or may be sent to the consumer via electronic mail. As a courtesy, the goods/services provider may also send the consumer a resource request message (e.g., email notification) and the resource request message may include a summary of details that are outlined in the invoice. To illustrate, the resource request message may summarize details such as an account number, a statement balance, and/or a payment due date. As the consumer may receive numerous such emails from a wide range and number of goods/services providers in addition to other non-payment related emails, the plethora of received resource request messages may need to be managed to ensure that resources (e.g., payment) are remitted to the respective goods/services providers.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
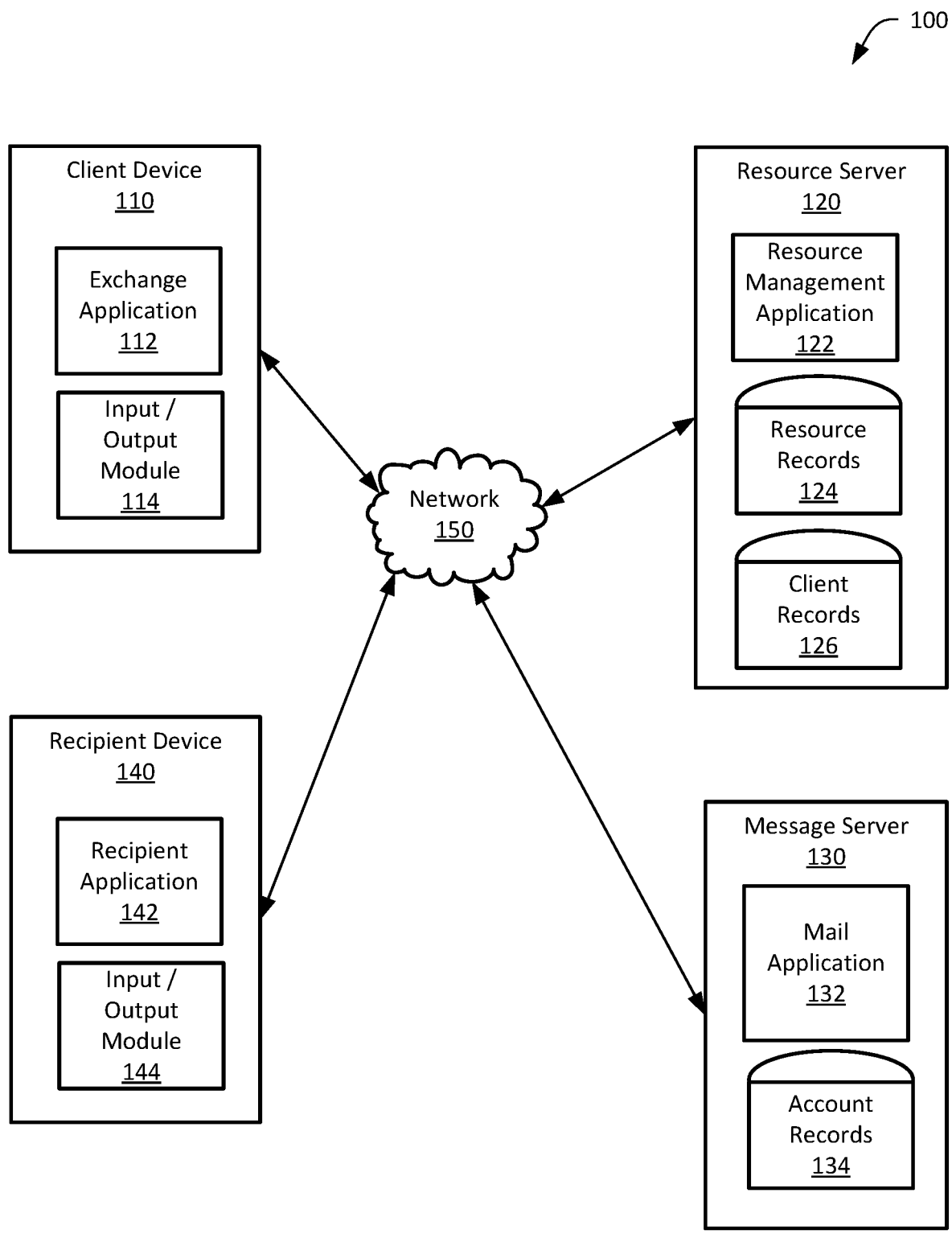
FIG. 1 illustrates, in block diagram form, a system for configuring data transfers based on electronic messages, in accordance with an example of the present application.

In one aspect, the present application describes a computing device that may include: a communication module; a processor coupled to the communication module; and a memory coupled to the processor. The memory may store instructions that, when executed, configure the processor to: receive, from a client device, an authentication credential for querying a message account associated with a user of the client device; associate the authentication credential with a client record of the user of the client device; identify, based on delegated access to query the message account at a message server using the authentication credential, a resource request message among a plurality of messages associated with the message account using a defined criteria; obtain, based on the resource request message, a resource parameter to define a proposed resource transfer to a recipient entity; generate and transmit, to the client device, a transfer request alert based on the proposed resource transfer for display on a non-messaging application interface at the client device, wherein the transfer request alert includes the obtained resource parameter and a selectable option; and in response to receiving, from the client device, a selection of the selectable option, allocate a resource associated with the resource parameter from the client record to a data record associated with the recipient entity.

In some implementations, the client record may include a user preference defining a scheduling criteria based on a due date associated with the resource request message, and allocating the resource may include allocating the resource based on the defined scheduling criteria.

In some implementations, the client record may include a user preference defining a transfer amount criteria including at least one of a full amount, a percentage amount, and a minimum amount, and allocating the resource may include allocating the resource based on the transfer amount criteria.

In some implementations, the instructions, when executed, may further configure the processor for: prior to allocating the resource from the client record to a data record associated with the recipient entity, receiving, from the client device, an authentication indication of the user via the non-messaging application.

In some implementations, the client record may be associated with an existing recipient list, and the instructions, when executed, may further configure the processor for appending a new recipient associated with the identified resource request message to the existing recipient list.

In some implementations, identifying the resource request message may include conducting at least one of optical character recognition or image recognition operations to identify the resource request message among the plurality of messages.

In some implementations, the authentication credential includes at least one of a user identifier, a password, and an OAuth token.

In some implementations, the message account may be an electronic mail (e-mail) account associated with the user of the client device, and the resource request message may be a bill payment notification e-mail generated by the recipient entity.

In some implementations, the defined criteria may include at least one of a keyword expression, an account number associated with a recipient identifier, an email address associated with a recipient, an electronic mail account domain associated with a recipient, and a recipient name associated with a list of geographically grouped recipients for identifying a resource request message.

In some implementations, identifying the resource request message may include identifying that a message includes an account number of an entity included in an existing recipient list associated with the client record.

In some implementations, the selectable option may be a user interface element that, when selected by the user of the client device, may confirm the defined proposed resource transfer.

In another aspect, the present application describes a computer-implemented method for configuring data transfers based on electronic messages. The method may include: receiving, from a client device, an authentication credential for querying a message account associated with a user of the client device; associating the authentication credential with a client record of the user of the client device; identifying, based on delegated access to query the message account at a message server using the authentication credential, a resource request message among a plurality of messages associated with the message account using a defined criteria; obtaining, based on the resource request message, a resource parameter to define a proposed resource transfer to a recipient entity; generating and transmitting, to the client device, a transfer request alert based on the proposed resource transfer for display on a non-messaging application interface at the client device, wherein the transfer request alert includes the obtained resource parameter and a selectable option; and in response to receiving, from the client device, a selection of the selectable option, allocating a resource associated with the resource parameter from the client record to a data record associated with the recipient entity.

In some implementations, the client record may include a user preference defining a scheduling criteria based on a due date associated with the resource request message, and allocating the resource may include allocating the resource based on the defined scheduling criteria.

In some implementations, the client record may include a user preference defining a transfer amount criteria including at least one of a full amount, a percentage amount, and a minimum amount, and allocating the resource may include allocating the resource based on the transfer amount criteria.

In some implementations, the client record may be associated with an existing recipient list, and where the method may further comprise appending a new recipient associated with the identified resource request message to the existing recipient list.

In some implementations, identifying the resource request message may include conducting at least one of optical character recognition or image recognition operations to identify the resource request message among the plurality of messages.

In some implementations, the authentication credential includes at least one of a user identifier, a password, and an OAuth token.

In some implementations, the message account may be an electronic mail (e-mail) account associated with the user of the client device, and the resource request message may be a bill payment notification e-mail generated by the recipient entity.

In some implementations, the selectable option may be a user interface element that, when selected by the user of the client device, confirms the defined proposed resource transfer.

In another aspect, a non-transitory computer-readable storage medium storing processor executable instructions that, when executed, may cause a processor to carry out the operations of one or more methods described herein. For example, the non-transitory computer-readable storage medium may include instructions of receiving, from a client device, an authentication credential for querying a message account associated with a user of the client device; associating the authentication credential with a client record of the user of the client device; identifying, based on delegated access to query the message account at a message server using the authentication credential, a resource request message among a plurality of messages associated with the message account using a defined criteria; obtaining, based on the resource request message, a resource parameter to define a proposed resource transfer to a recipient entity; generating and transmitting, to the client device, a transfer request alert based on the proposed resource transfer for display on a non-messaging application interface at the client device, wherein the transfer request alert includes the obtained resource parameter and a selectable option; and in response to receiving, from the client device, a selection of the selectable option, allocating a resource associated with the resource parameter from the client record to a data record associated with the recipient entity.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

While numerous examples resource servers described herein relate to banking institutions, the systems and methods described herein may also be applicable to resource servers associated with non-banking applications that store, process, or manage various types of resources. Example resources may include money, currency, tokens, digital assets, or goods/services of value to an entity, among other examples.

Systems and methods for configuring data transfers based on electronic messages are described herein. Example resource request messages may include electronic mail (e-mail) messages or short message service (SMS) message, among other examples. The resource request messages may be notifications that invoices, credit card statements, or demands for payment are available and that a transferor entity should access the invoices/statements and attend to payment.

A recipient entity may provide delivered goods or render services and may transmit a resource request message to a transferor entity. The resource request message may include details for requesting payment for the delivered goods or for rendered services. To illustrate, the recipient entity may be a hydro utility provider providing electricity and delivering the electricity to a transferor entity's property. The recipient entity may periodically (e.g., monthly or any other time period) make invoices or statements available on an electronic portal and the transferor entity may download or view such invoices or statements via the electronic portal. The transferor entity may need to log into the electronic portal using login credentials and may subsequently transmit payment to the recipient entity. As a courtesy or reminder to the transferor entity, the recipient entity may send an e-mail message to the transferor entity reminding the transferor entity of the request for payment. The e-mail message may be an example of a resource request message.

The transferor entity may also receive other resource request messages from several other respective goods or service providers. The resource request messages may be received among a plethora of other e-mail messages unrelated to invoices or statements requesting payment. As such, managing the numerous resource request messages may be a laborious task. Further, upon receiving such resource request messages, the transferor entity may be required to log into proprietary electronic portals for retrieving invoices or statements and/or may be required to log into online banking portals. When using the online banking portals, the transferor entity may be required to enter recipient information, payment amount information, or other parameters for transferring resources to the recipient entity. It may be desirable to provide systems and methods for providing notifications of resource request messages and for managing associated resource transfers.

Reference is made to FIG. 1, which illustrates, in block diagram form, a system 100 for configuring data transfers based on electronic messages, in accordance with an example of the present application. A recipient entity may be a goods and/or services provider for a consumer (e.g., a transferor entity). The recipient entity may periodically generate invoices or statements for goods/services rendered. The recipient entity may also transmit resource request messages, such as e-mail notifications, containing summary information (e.g., amount due, account number, etc.) to a transferor entity. It may be understood that resource request messages may be provided using other messaging formats or via other communication systems.

The system 100 includes a client device 110, a resource server 120, and a message server 130. In some examples, the system 100 may also include a recipient device 140. The system 100 includes a network 150. The client device 110, the resource server 120, the message server 130, and the recipient device 140 may be configured to communicate over the network 150 with one another or with any other similar computing device. The network 150 may include one or a combination of interconnected wired or wireless networks, including the Internet, local area networks, wireless area networks, or the like.

The client device 110 may be associated with a transferor entity. For example, the transferor entity may be a consumer of goods/services. The transferor entity may be associated with the client device 110 and may be a hydro-electricity customer of the recipient entity. The recipient entity may be associated with the recipient device 140. In exchange for providing and delivering electricity, the transferor entity may transfer resources (e.g., money, currency, tokens, or the like) to the recipient entity. It may be understood that the recipient entity may be any other type of goods and/or services provider, such as a credit card provider, a cellular device service provider, or a building security service provider, among other examples.

The transferor entity may transmit resources to the recipient entity via a resource server 120. For example, the resource server 120 may be associated with a banking institution and may provide banking services to the transferor entity. In some examples, the resource server may also provide banking services to the recipient entity. In an example where the resource server 120 provides banking services to both the transferor entity and the recipient entity, the resource server 120 may allocate resources from a client record associated with the client device 110 to client record associated with the recipient device 140. That is, in some examples, allocating resources from the client record associated with the client device 110 to the client record associated with the recipient device 140 may include transferring data from one client record to another client record.

In an example where the resource server 120 may not provide banking services to the recipient entity, the resource server 120 may transmit a record of resources to a server associated with a banking institution that provides banking services to the recipient entity. In doing so, the resource server 120 may allocate the resources to a data record that is stored at the resource server 120 and that is associated with the recipient entity. Subsequently, the resource server 120 may settle a resource transfer with the server associated with the other banking institution that provides banking services to the recipient entity.

The client device 110 includes one or more processors, memory, and a communication module for providing communications capabilities with other computing devices. The client device 110 may be configured to receive input or provide output for interacting with the transferor entity. For example, the client device 110 may include an exchange application 112 having processor executable instructions stored in memory that, when executed, cause a processor to conduct operations described herein. In some examples, the exchange application 112 may be a mobile banking application associated with the resource server 120 (e.g., banking institution server). The exchange application 112 may receive input from a transferor entity. For example, the exchange application 112 may receive authentication credentials for accessing a banking account or may receive user input for conducting actions associated with resource request messages or other actions associated with a client record of the transferor entity. The exchange application 112 may provide a user interface allowing the transferor entity to access or manage a banking account or may provide a user interface to display notifications and to accept user input in response to the displayed notifications.

The transferor entity may interact with the client device 110 via an input/output module 114. For example, the input/output module 114 may include a touch screen display for displaying a user interface and a touch screen interface for receiving motion or touch input from the transferor entity. Other examples of input/output modules for receiving user input and providing output may be contemplated.

As described, the resource server 120 may be associated with a banking institution and may be a single server, multiple servers, a server farm, or any other such arrangement of computing devices to implement computing server-like functionality. The resource server 120 includes one or more processors, memory, and a communication module for providing communications capabilities with other computing devices.

The resource server 120 may include a resource management application 122 that includes processor executable instructions stored in memory that, when executed, cause a processor to conduct operations described herein. For instance, the resource management application 122 can include processor executable instructions that, when executed, may cause a processor to: receive, from the client device 110, an authentication credential for querying a message account associated with a user of the client device 110 and associate the authentication credential with a client record of the user of the client device 110. Further, the processor may identify, based on delegated access to query the message account at the message server 130 using the authentication credential, a resource request message, such as a bill payment notification email message, among a plurality of messages associated with the message account using a defined criteria and obtain a resource parameter to define a proposed resource transfer to a recipient entity. The processor may generate and transmit, to the client device 110, a transfer request alert based on the proposed resource transfer for display at the client device 110. In response to receiving, from the client device 110, a selection of a selectable option, the processor may allocate a resource from a client record associated with the client device 110 to a client record associated with the recipient device 140. Other operations for providing notifications of resource request messages and for managing associated resource transfers may be contemplated.

The resource server 120 may include resource records 124. The resource records 124 may track resources including currency, monetary value, digital assets, tokens, or precious metals, among other examples. Further, the resource server 120 may include client records 126. A client record may be associated with a transferor entity associated with the illustrated client device 110. In examples where the resource server 120 provides banking services to the recipient entity associated with the recipient device 140, the client records 126 may include a data or client record associated with the recipient device 140.

The client records 126 may include data records associated with entities. For instance, the respective data records may include data associated with savings bank accounts, chequing bank accounts, investment accounts, or lending products (e.g., line-of-credit account, mortgage, etc.), among other examples. Further, a client record may be associated with one or a portion of resource records 124. The client record may be a data structure for tracking a running balance of money or other value being managed at the resource server 120.

In some examples, the transferor entity associated with the client device 110 may periodically interact with the exchange application 112 (e.g., mobile banking application) for transferring resources to recipient entities (e.g., goods or services providers) for settlement of statements or invoices. As resource transfers may occur on a periodic basis (e.g., monthly), the client records 126 may respectively include a list of recipients (e.g., payee list) whom the respective transferor entities periodically provide payment. The transferor entity interacting with the example mobile banking application may thereby expediently select and provide instructions to the exchange application 112 (e.g., mobile banking application) for providing payment to the list of recipients.

The message server 130 may be a single server, multiple servers, a server farm, or any other such arrangement of computing devices to implement computing server-like functionality. The message server 130 includes one or more processors, memory, and a communication module for providing communications capability with other computing devices. In some examples, the message server 130 may be an e-mail server for providing e-mail account services to users. For instance, the message server 130 may be a Microsoft Exchange™ server, a cloud-based e-mail server (e.g., Google Gmail™ etc.), or a SMS server, among other examples.

The message server 130 may include a mail application 132 that includes processor executable instructions stored in memory that, when executed, cause a processor to receive and transmit electronic messages and for managing such electronic messages associated with one or more message accounts, among other example operations. The message server 130 may include account records 134 for storing electronic messages associated with respective e-mail accounts for respective users.

Electronic messages may include e-mail received from other e-mail account users, such as family, friends, commercial entities, or the like, and may relate to a variety of matters. In some examples, a recipient entity may transmit a bill notification email message to the transferor entity to request payment (e.g., transfer of resources) for provided goods and/or rendered services. As will be described, bill notification email messages may include the recipient name, a requested resource payment amount, due date, or any other data or combination of such information. The recipient device 140 of the recipient entity may generate and transmit the bill notification email message to an e-mail account of the transferor entity as a reminder that payment for provided goods/rendered services is due.

As described, the recipient device 140 may be associated with a recipient entity (e.g, payee entity). The recipient device 140 includes one or more processors, memory, and a communication module for providing communications capabilities with other computing devices. The recipient device 140 may include a recipient application 142 that includes processor executable instructions stored in memory that, when executed, cause a processor to interact with the recipient entity. In an example where the resource server 120 provides banking services to the recipient entity of the recipient device 140, the recipient application 142 may be a banking application and may include processor executable instructions stored in memory that, when executed, cause a processor to interact with the resource server 120 (e.g., banking institution server). Further, the recipient application 142 may include processor executable instructions that, when executed, cause a processor to generate resource request messages, such as bill notification email messages, and to transmit, to the message server 130, the resource request messages that are addressed to an e-mail account associated with a transferor entity. As will be illustrated in examples herein, the resource request messages may be email messages reminding a transferor entity of invoice payment or that an invoice or statement is now available via an electronic portal maintained by the recipient entity.

The recipient entity may interact with the recipient device 140 via an input/output module 144. For example, the input/output module 144 may include a touch screen display for displaying a user interface and a touch screen interface for receiving motion or touch input from the transferor entity. Other examples of input/output modules for receiving user input and providing output may be contemplated.

A transactional relation between the transferor entity (e.g., a consumer) and the recipient entity (e.g., a goods/services provider) may be periodic (e.g., monthly, weekly, etc.) or ad hoc in nature. In illustrating examples described herein, the recipient entity, via the recipient device 140, may generate and transmit a resource request message to a message account associated with the transferor entity requesting a transfer of resources. The message account may be an e-mail account and the transferor entity may, via the client device 110, access messages that are stored at the message server 130. In some scenarios, the transferor entity may receive resource request messages from several different goods and/or service providers (e.g., recipient entity). The several resource request messages may be among a plurality of messages associated with a message account of the transferor entity. Filtering through and managing the numerous resource request messages may be a laborious task.

Further, the resource request messages may respectively include an electronic hyperlink or another mechanism for directing the transferor entity to an electronic portal maintained by the respective recipient entities for transferring resources to the recipient entity. In this way, the transferor entity may need to manage numerous login credentials associated with the respective online portals of each of the recipient entities. In an example where the resource request message includes an electronic hyperlink or other mechanism for directing the transferor entity to the resource server 120 associated with a banking institution, the transferor entity may be required to, via the client device 110, enter resource parameters or configure a resource transfer operation. For example, when transferring resources to a recipient entity, the transferor entity may be required to specify the recipient entity, an account number associated with the transferor entity, a quantitative amount of resources to transfer, a date that the resource transfer is to occur, or other information for transferring resources. In this way, tasks for transferring resources to several distinct recipient entities may be laborious and time consuming. Accordingly, to manage a plurality of resource request messages transmitted to a message account of a goods/services consumer, systems and methods of configuring resource transfers from a transferor entity to a recipient entity based on a received resource request message are provided.

Figure 2:
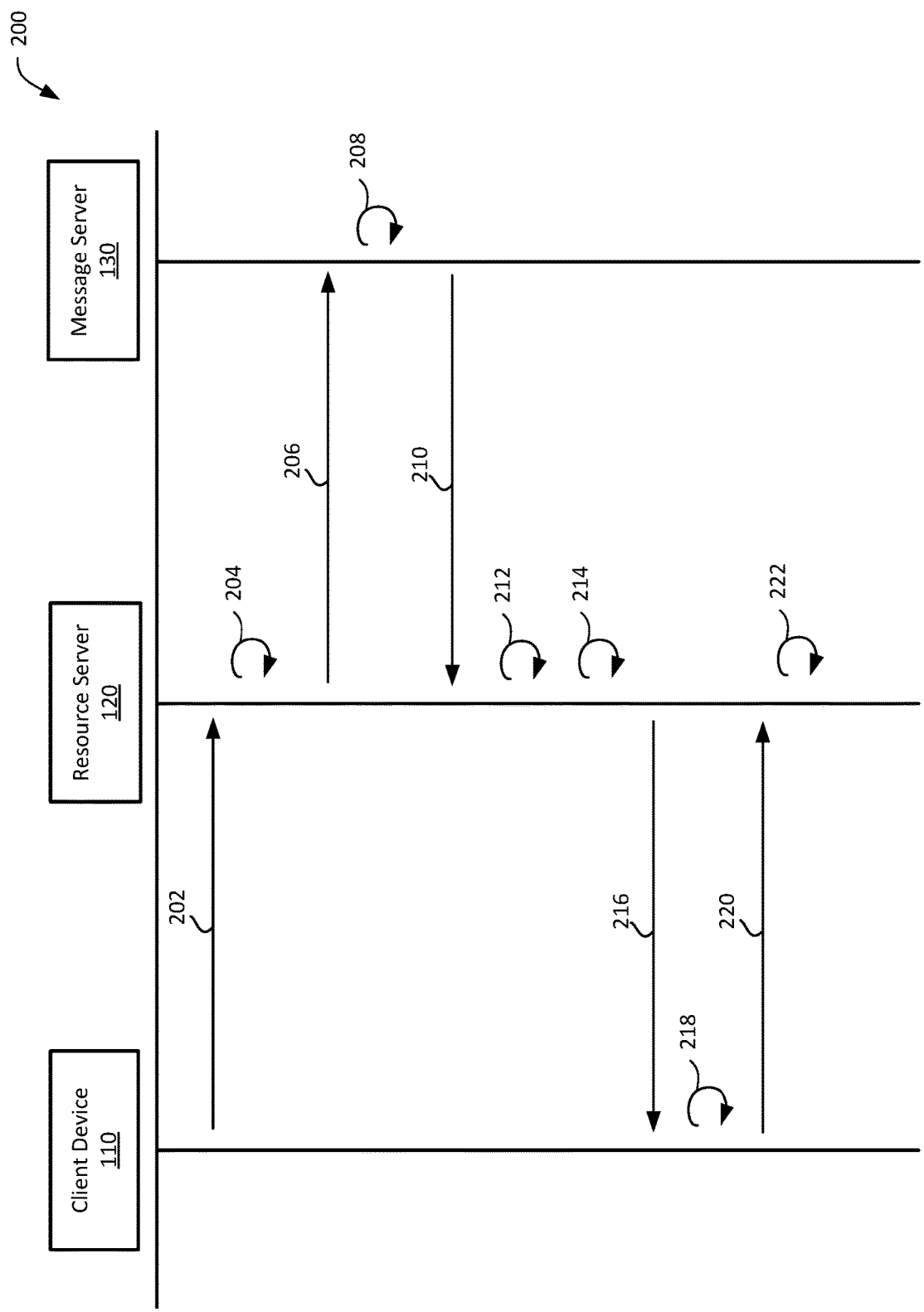
FIG. 2 illustrates a signal diagram illustrating exchanges among computing devices for configuring data transfers based on electronic messages, in accordance with an example of the present application.

Reference is made to FIG. 2, which illustrates a signal diagram 200 illustrating exchanges among computing devices for configuring data transfers based on electronic messages, in accordance with an example of the present application. The signal diagram 200 includes the example client device 110, the resource server 120, and the message server 130 of FIG. 1.

The signal diagram 200 illustrates operations that may be implemented, at least in part, through processor executable instructions stored at one or more of the computing devices. The operations may be carried out by one or more processors of the respective devices, servers, or applications thereon. Although the signal diagram 200 illustrates operations or exchanges associated with particular computing servers or devices, it may be understood that a particular operation illustrated as being conducted at one particular device or server may alternatively be conducted at another device or server. For example, as will be apparent in some examples described herein, an operation for identifying a resource request message among a plurality of messages may be conducted at the resource server 120 or the message server 130.

To illustrate example operations of the present application, the client device 110 may be associated with a transferor entity. The exchange application 112 (FIG. 1) may be a mobile banking application associated with the resource server 120 (e.g., banking institution server). The client device 110 may provide an output interface for displaying notification messages or alert messages and may include an input interface for receiving user input, such as input representing authentication credentials or input representing instructions for conducting action (e.g., paying bills, transferring resources, etc.), among other examples.

Further, the client device 110 may receive or access a plurality of messages associated with a message account of the transferor entity. For example, the message account may be an e-mail account maintained at the message server 130. One or more resource request messages may be among the plurality of messages of the message account. For instance, a resource request message may be a bill payment notification e-mail generated by and received from a recipient entity or a payee entity. The payee entity may be a provider of goods or services to the transferor entity. In some examples, the bill payment notification email may include summary information extracted from a detailed invoice or statement.

As an illustrating example, the recipient entity may be a credit card issuer, such as Toronto-Dominion Bank. The recipient entity may generate a detailed credit card statement at the end of a calendar month. The recipient entity may also generate and transmit a bill payment notification email to an email message account of the transferor entity containing summary information based on the detailed credit card statement. The bill payment notification email may include an amount due, a due date, and a portion of an identifying account number. Systems and methods for identifying the bill payment notification email (e.g., resource request message) among a plurality of messages and configuring resource transfers based on that bill payment notification email are described herein.

At operation 202, the client device 110 transmits, to the resource server 120, an authentication credential for querying a message account associated with a user of the client device 110. The authentication credential may include one or a combination of a user identifier, a password, or an OAuth token (e.g., Open Authorization token), among other examples. The authentication credential may be associated with a message account of the user of the client device 110. The message account may be an e-mail account provided and managed at the message server 130. The e-mail account associated with the user may include a plurality of messages addressed to an e-mail address of the user. In some examples, by transmitting the authentication credential to the resource server 120, the client device 110 may delegate, to the resource server 120, access to query the message account of the user.

At operation 204, the resource server 120 may associate the authentication credential with a client record of the user of the client device 110. As the user may be logged into a mobile banking application at the client device 110, the resource server 120 may identify the user from which the authentication credential was received and may associate that authentication credential with one of the client records 126 stored at the resource server 120. As described, the authentication credential may be used to access or to query the message account associated with the authentication credential.

At operation 206, using the received authentication credential, the resource server 120 may query the message server 130 on behalf of the client device 110. The resource server 120 may transmit a signal representing a particular query to the message server 130. For example, the query may include search parameters for identifying e-mails originating from one or more recipient entities of a payee list associated with the user. The query may be a keyword-based query for messages that include expressions or terms, such as "payment due", "invoice", "statement", etc., which may identify a resource request message (e.g., a bill payment notification email). As will be illustrated in examples herein, other search parameters for identifying resource request messages may be contemplated.

At operation 208, the message server 130 may conduct operations to query the message account (e.g., e-mail account) associated with the authentication credential and to identify one or more resource request messages among a plurality of messages using defined criteria. For example, the defined criteria may include one or a combination of the search parameters described with reference to operation 206. In some examples, the defined criteria may include a keyword or expression for identifying a bill payment notification email. In some examples, the defined criteria may include portions of an account number (e.g., Toronto-Dominion Bank credit card account number) issued by the recipient entity and associated with the transferor entity. In some examples, the defined criteria may include a particular email address or an e-mail account domain associated with the recipient entity. For example, as bill payment notification emails may be routinely sent by an e-mail address from a particular domain, such as "@billpayments.TD.com", the defined criteria may include querying the message account for messages from an entity having the domain "@billpayments.TD.com". In another example, bill payment notification emails may be routinely sent from a dedicated email address, such as "billpayments@TD.com". Thus, the defined criteria may include querying the message account for messages from an entity having the email address "billpayments@TD.com". Other email addresses or electronic message domains may be contemplated.

In some examples, the defined criteria may include a listing of recipient entities who may be associated with a corresponding geographical location, where the geographical location may correspond to a region in which the transferor entity is located. For example, the listing of recipient entities may include United States based recipient email addresses when the user of the client device 110 is based on the United States. Similarly, the listing of recipient entities may include Canadian based recipient email addresses when the user or transferor entity is based in Canada.

At operation 210, the message server 130 may transmit, to the resource server 120, a signal representing a query result. When the message server 130 identifies a resource request message, such as a bill payment notification e-mail, the query result may identify the resource request message. In some examples, the message server 130 may transmit a copy of the resource request message to the resource server 120. In some other examples, the message server 130 may parse the identified resource request message to obtain parameters based on the resource request message. The signal representing the query result may include the obtained parameters relating to the bill payment notification e-mail.

At operation 212, the resource server 120 may obtain, based on the resource request message, a resource parameter to define a proposed resource transfer to a recipient entity. For example, the resource parameter may include a set of values for configuring the proposed resource transfer. The set of values may include a due date (e.g., the bill payment is due on the 15$^{th}$ of the month), a bill payment amount (e.g., total credit card balance of goods purchased), or a portion of a credit card account number, among other examples.

At operation 214, the resource server 120 may generate a transfer request alert based on the proposed resource transfer. In some examples, the transfer request alert may be configured for display at the client device 110. In some examples, the transfer request alert may be configured for display as a banner on a user interface of the client device 110. In another example, the transfer request alert may be configured for display as a lock-screen notification on the user interface of the client device 110.

Based on the above-described example operations, the resource server 120 may define a proposed resource transfer based on an identified resource request message. Further, the resource server 120 may generate a transfer request alert for display at the client device 110 for notifying the user of the client device 110 of the bill payment notification email, thereby ameliorating the need for the user of the client device 110 to review a plurality of messages for identifying resource request messages seeking resource transfers (e.g., bill payment). In some examples, the transfer request alert may include the obtained set of values representing the resource parameter and a selectable option. The resource parameter may include particulars pertinent for defining a resource transfer (e.g., transferor identifier, recipient identifier, amount, desired date of transfer, or the like). In some example, the selectable option may include a "confirm" or "authorize" user interface element for receiving user input associated with the transfer request alert. In some examples, the selectable option may include an "ignore" user interface element for receiving user input to disregard the transfer request alert. Other selectable option examples for receiving user input associated with the transfer request alert may be contemplated.

At operation 216, the resource server 120 transmits the generated transfer request alert to the client device 110. In some examples, the client device 110 may display the transfer request alert on a non-messaging application interface. The non-messaging application interface may be unaffiliated or un-linked with an e-mail application. For instance, the transfer request alert may be displayed by a mobile banking application interface or by notification banners/pop-up banners within an operating system executing on the client device 110. In some examples, the client device 110 may display the transfer request alert as a notification banner on a lock-screen of the client device 110 (e.g., password entry screen when the client device 110 is electronically locked).

At operation 218, the client device 110 may display the transfer request alert via the input/output module 114. For example, the client device 110 may display the transfer request alert in combination with an electronic lock screen of the client device. Further, the client device 110 may receive user input via one or more selectable options associated with the displayed transfer request alert.

In response to receiving from the client device 110 a selection of the selectable option, the client device 110, at operation 220, transmits a signal representing the selection of the selectable option to the resource server 120. In some examples, the selectable option may be a "confirm" selectable option for confirming the proposed resource transfer.

At operation 222, the resource server 120 allocates a resource associated with the resource parameter from the client record of the user of the client device 110 to a client record associated with the recipient entity associated with the previously identified resource request message. In some examples, allocating the resource includes transferring data representing the resource from the client record of the user of the client device 110 to a client record associated with the recipient entity.

Accordingly, in some implementations, the resource server 120 utilizes delegated authority to query message accounts associated with transferor entities, thereby searching for bill payment notification or similar messages. The transferor entity of respective client devices 110 may not need to traverse or identify bill payment notification messages among a plurality of messages. Further, the example operations described herein generate a proposed resource transfer based on identified bill payment notification messages, such that the transferor entity of respective client devices 110 need not extract bill payment details for making bill payments. Subsequently, the resource server 120 may generate and transmit transfer request alerts based on the proposed resource transfer, thereby seeking confirmation from the transferor entity of the respective client devices 110.

Figure 3:
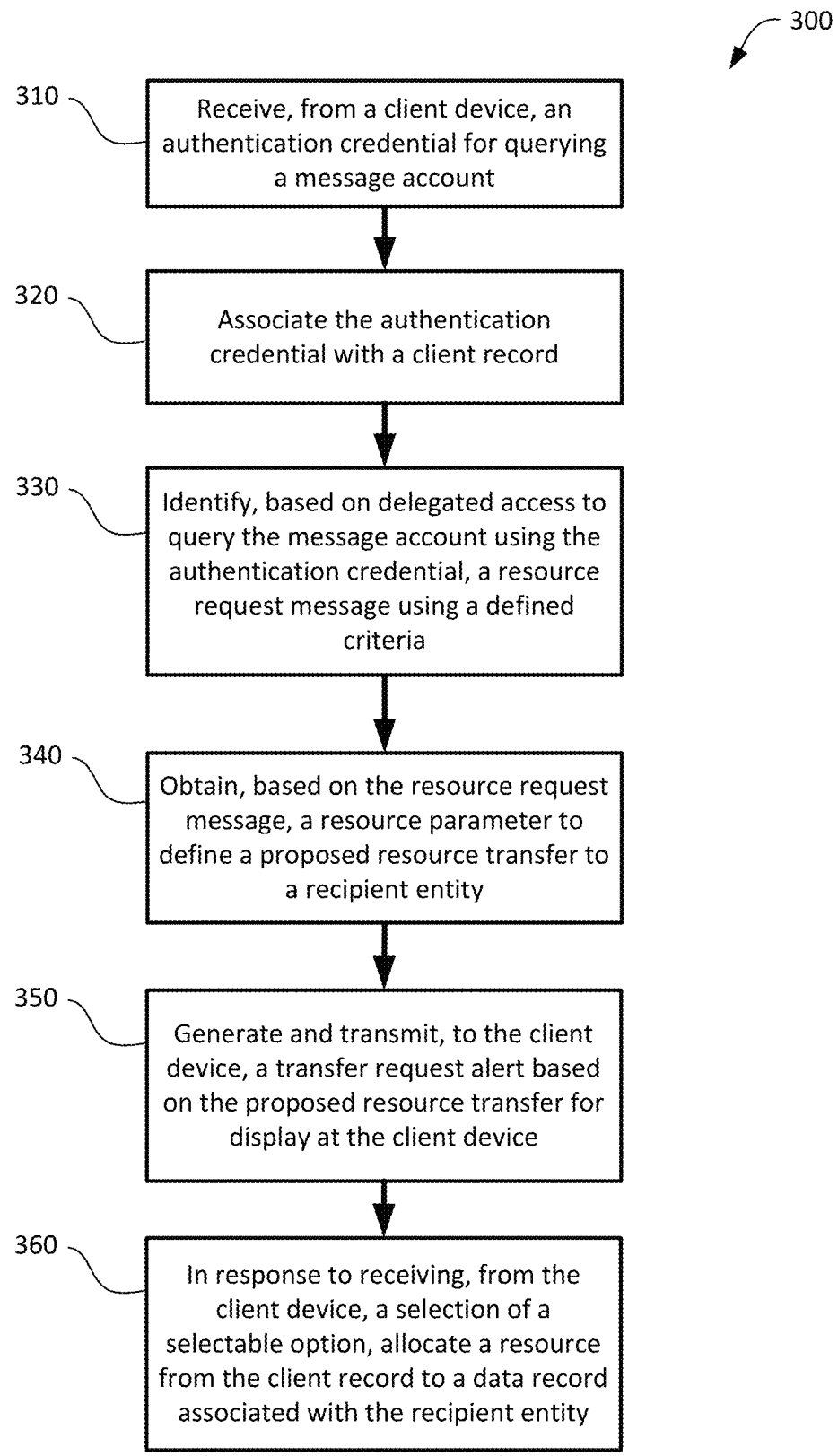
FIG. 3 illustrates, in flowchart form, a method for configuring data transfers based on electronic messages, in accordance with an example of the present application.

Reference is made to FIG. 3, which illustrates, in flowchart form, a method 300 of configuring data transfers based on electronic messages, in accordance with an example of the present application. The method 300 includes operations that may be carried out by one or more processors of the resource server 120 (FIG. 1). For example, the method 300 may be implemented, at least in part, through processor executable instructions associated with the resource management application 122 (FIG. 1). In some examples, one or more operations may be implemented via processor executable instructions in other applications or in an operating system stored and executed on the resource server 120.

At operation 310, the processor receives, from the client device 110, an authorization credential for querying a message account associated with a user of the client device 110. The authorization credential may include a user identifier and/or a password phrase. In some examples, the authorization credential may be an OAuth token used by the resource server 120 to access a message account at the message server 130 (FIG. 1). By sharing an OAuth token, the user of the client device 110 may refrain from sharing any username and/or passwords. That is, using the received authentication credential, the resource server 120 may access the message account of a transferor entity.

At operation 320, the processor associates the authentication credential with a client record 126 (FIG. 1) of the user of the client device 110. For instance, the user of the client device 110 may be logged into the exchange application 112 (e.g., mobile banking application) for interfacing with the resource server 120. Further, the resource server 120 may provide banking services to the user of the client device 110 and may store a client record 126 associated with that user. Accordingly, the processor may identify the client record 126 associated with the user and associate the received authentication credential with the identified client record 126, such that any delegated access to a message account associated with the authentication credential may be associated with the corresponding client record 126.

At operation 330, the processor identifies, based on delegated access to query the message account at the message server 130 (FIG. 1) using the authentication credential, a resource request message among a plurality of messages associated with the message account using a defined criteria.

In some examples, the resource request message may be a bill payment notification email containing summary information of an invoice or an account statement. The resource request message may be generated to remind the transferor entity (e.g., user of the client device 110) of a request for payment. The resource request message may include summary information, such as a statement balance, a minimum payment amount, a due date, and/or a portion of an account number (e.g., account ending in 6873). In the present example, the resource request message may include information for defining a proposed resource transfer or bill payment operation, thereby ameliorating the need for the transferor entity to take additional steps to access an invoice or an account statement. In some scenarios, the transferor entity may not wish to examine all details of the invoice or account statement.

In some examples, the processor accesses messages of the transferor entity's message account at the message server 130. In some examples, the processor may access the messages by transmitting a signal representing a query of messages of the transferor entity's message account. In some other examples, the processor may transmit a signal representing a request to retrieve messages that may be identified as a possible resource request message. Other methods or operations of accessing messages to identify a resource request message among a plurality of messages associated with the message account may be contemplated.

The processor may identify a resource request message (e.g., bill payment notification e-mail, or the like) among a plurality of messages (e.g., global set of e-mail messages associated with the e-mail account of the transferor entity) based on optical character recognition or image recognition operations using one or more defined criteria. For instance, the processor may query or scan the plurality of messages to identify keyword expressions, such as "Statement Balance", "Minimum Payment", or "Due Date" to identify bill payment notification related emails.

In some examples, the defined criteria may be based on a list of bill payees. For instance, the client record 126 of the user of the client device 110 may include a list of pre-configured payee names or identifiers. The processor may query or scan the plurality of messages to identify the payee name or payee identifier, such as "Toronto-Dominion Bank", "institution number 004", or the like. Thus, the user of the client device 110 may setup a list of desired payees to which resources may be transferred to and the processor may identify messages that may be associated with the payees included in the list.

In some other examples, the defined criteria may include a portion of an account number for identifying the transferor (e.g., customer) to the recipient (e.g., payee). Accordingly, when the processor identifies the account number from a resource request message, the processor may identify the payee on an existing recipient entity list (e.g., payee list).

In another example, if the recipient entity name "Rogers" was previously added to the existing recipient entity list, the processor may periodically be configured to query messages in search of resource request messages from the entity name "Rogers", thereby identifying new or updated invoices or account statements.

In some examples, the defined criteria may be based on a list of supported bill payees. The list of supported bill payees may be a list of geographically grouped recipient entities who may receive resource transfers via the resource server 120. For instance, the list of supported bill payees may be associated with a client record 126 and may include recipient entities based in a region associated with the client record 126. That is, when the client record 126 is associated with a user based on Canada, the list of supported bill payees may include Canadian-based payees. When the client record 126 is associated with a user based in the United States, the list of supported bill payees may include United States based payees. Accordingly, the processor may identify a resource request message when the processor identifies a payee identifier that is listed in the list of supported bill payees.

In some examples, recipient entities or payees may be configured to transmit resource request messages from one or more dedicated email addresses or domains. Thus, in some examples, the defined criteria may be based on a list of payee email addresses or a domain of payees. For instance, a client record 126 may include a list of payee email addresses or domain names associated with the recipient entity. The processor may identify a resource request message when the processor identifies an e-mail message received from one of the email addresses or domain names listed in a payee list.

In some examples, the processor may identify a resource request message based on an ordered or sorted payee list. For example, a transferor entity may regularly transfer resources for paying a payee more frequently than another payees. Accordingly, the processor may streamline operations by prioritizing message scan operations to identify resource request messages from frequently paid recipient entities and conducting message scan operations to identify resource request messages from less frequently paid recipient entities at a later time.

In some examples, the processor may identify one or more resource request messages in response to receiving an explicit instruction from the user of the client device 110. For instance, the exchange application 112 may include operations for provide a user interface for display at the client device 110, where the user interface includes a user interface element labelled "scan emails to add bill payees". In response to receiving a signal representing selection of the user interface element labelled "scan emails to add bill payees", the processor may identify resource request messages based on one or a combination of the example defined criteria described herein and, in response, may append newly identified recipient entity or payees associated with the identified resource request messages to an existing payee list associated with a client record 126.

In some examples, a time/date stamp associated with recent operations for identifying resource request messages may be recorded at the client record 126. Accordingly, based on the stored time/date stamps, the processor may conduct operations to identify new resource request messages based on a predetermined schedule (e.g., hourly, daily, weekly, monthly, etc.). In some examples, the time/date stamp record may determine the frequency that the processor may execute operations for identifying new resource request messages. That is, the processor may conduct operations to identify new resource request messages newer than the stored time/date stamp.

At operation 340, the processor obtains a resource parameter to define a proposed resource transfer to a recipient entity. The resource parameter may include a set of values for configuring a proposed resource transfer. For example, the resource parameter may include a payee/recipient identifier, a proposed transfer amount, or a proposed transfer date, among other example values. Accordingly, the processor may configure a proposed resource transfer based on the previously identified resource request message, thereby ameliorating a need for the user of the client device 110 (e.g., transferor entity) to log into an online portal of the recipient entity or to configure the bill payment by reviewing bill payment notification emails and conducting data entry for configuring a proposed resource transfer.

In some examples, the processor may store predetermined preferences at a client record 126. The predetermined preferences may define the proposed resource transfer. To illustrate, the client record 126 may store a user preference defining a transfer amount criterion. The transfer amount criterion may be one of a full amount, a percentage amount, or a minimum amount. When the transferor entity prefers to only pay the minimum amount due for each credit card statement, the client record 126 associated with that transferor entity may store such a predetermined preference. Thus, when the resource server 120 defines a proposed resource transfer, the processor may define the proposed resource transfer based on a minimum payment amount that is specified on the identified resource request message (e.g., bill notification payment e-mail).

In some other examples, the transferor entity may prefer to pay the full outstanding balance for each credit card statement. Thus, the processor may define the proposed resource transfer based on the full payment amount that is specified on the identified resource request message. In some other examples, the transferor entity may prefer to pay 50% (or any other percentage) of the full outstanding balance for each credit card statement. Thus, the processor may define the proposed resource transfer based on a calculated percentage of the full payment amount specified on the identified resource request message.

In some examples, the processor may define the proposed resource transfer based on a determined quantity of resources associated with a client record 126 of the transferor entity. To illustrate, in a scenario where the resource request message includes a payment request for $3,000; however, the client record 126 associated with the transferor entity currently includes resources in an amount of $2,000, the processor may define the proposed resource transfer based on a minimum payment amount (e.g., 10% of the total payment request amount). In the present example, the proposed resource transfer may be defined so as not to overdraw a banking account associated with the transferor entity.

In some other examples, the client record 126 may include a user preference defining that any proposed resource transfer shall not cause the banking account associated with the transferor entity to decrease below a threshold amount (e.g., $1,000). In the present example, when the client record 126 associated with the transferor entity currently includes resources in the amount of $2,000, the processor may define the proposed resource transfer having an amount of $1,000, such that the banking account associated with the transferor entity does not decrease below the preferred threshold amount. Accordingly, in some examples, the processor may define the proposed resource transfer based on a threshold resource availability preference.

In some examples, the client records 126 may store predetermined preferences for defining a scheduling criteria. The scheduling criteria may be based on a due data specified in an identified resource request message. To illustrate, the transferor entity may prefer to transfer resource associated with the resource request message on the same day that the payment request is received. In some other examples, the transferor entity may prefer to transfer resource associated with the resource request message no earlier than two days before the payment due date specified on a bill payment notification e-mail. In scenarios where the transferor entity may wish to delay resource transfer (e.g., for cash flow planning) until a date nearer to a deadline, the processor may define the proposed resource transfer based on scheduling criterion stored in a client record of a transferor entity.

In some examples, the processor may define the proposed resource transfer based on criteria or rules defined by an administrator of the resource server 120 and stored at the resource server 120. For instance, the criteria or rules for defining the proposed resource transfer may be based on a resource profile report associated with a client record 126. That is, the criteria or rules may permit defining the proposed resource transfer with a minimum payment amount for a client record 126 that may be associated with an excellent history of transferring resource as requested (e.g., excellent credit history). In contrast, the criteria or rules may impose defining the proposed resource transfer with a full payment amount for a client record 126 that may be associated with a poor history of transferring resource as requested (e.g., poor credit history). Other criteria or rules stored at the resource server 120 for defining the proposed resource transfer may be contemplated.

At operation 350, the processor generates and transmits, to the client device 110, a transfer request alert based on the proposed resource transfer for display on a non-messaging application interface at the client device 110. The transfer request alert may include the obtained resource parameter and a selectable option. In some examples, the selectable option may include a user interface element that, when selected by a user of the client device 110, confirms the defined proposed resource transfer. Other examples of selectable options may include options to "ignore" or snooze (e.g., to "remind in x hours"). In some examples, when the client device 110 receives an input associated with the snooze option, the input may be transmitted to the resource server 120 and the resource server 120 may diarize the input associated with the snooze option. The resource server 120 may, after x hours, generate and transmit another transfer request alert to the client device 110 for reminding the user of the proposed resource transfer to the recipient entity. In some other examples, when the client device 110 receives an input associated with the snooze option, the client device 110 may diarize or setup a timer associated with the snooze option. The client device 110 may, after x hours, re-display the transfer request alert at the client device 110.

In some examples, the selectable options may be configured to receive user input for determining whether to proceed with the proposed resource transfer and/or for determining whether the proposed resource transfer needs to be revised. In some examples, the processor may generate one or more selectable options based on current available resources associated with the client record 126 of the transferor entity. For instance, the processor may generate an array of selectable options indicating a number of proposed resource transfer amounts, such that the user of the client device 110 may select, from the array, a desired resource transfer amount.

In response to receiving, from the client device 110, a selection of the selectable option (to confirm or initiate the resource transfer), the processor, at operation 360, may allocate a resource associated with the resource parameter from the client record of the user of the client device 110 to a data record associated with the recipient entity. For example, in response to receiving a selection of a selectable user interface associated with a "confirm" option, the processor may allocate a resource.

In scenarios where the resource server 120 associated with a banking institution provides banking services to both the user of the client device 110 and the recipient entity, the processor allocates the transferred resource (e.g., payment) from a client record 126 of the user to another client record 126 associated with the recipient entity. In scenarios where the resource server 120 may not provide banking services to the recipient entity, the resource server 120 may allocate the transferred resource to a data record stored at the resource server 120, where the data record may be associated with the recipient entity as a payee. Subsequently, the processor may transmit the resources to a server associated with another banking institution that provides banking services to the recipient entity for settling the resource transfer or payment. That is, allocating or transferring a resource may include a data transfer from a data record associated with a transferor entity to a data record associated with a recipient entity.

In some alternate implementations, a transferor entity may forward, to the resource server 120, messages that the transferor entity identifies as potential resource request messages. That is, a user of a client device 110 may review messages associated with a user message account and forward potential bill payment notification emails to the resource server 120. In some examples, the user may forward bill payment notification emails to a dedicated e-mail address associated with the banking institution (e.g., billpay@TD.com). Accordingly, the resource server 120 may configure proposed resource transfers based on such received bill payment notification emails. Further details of this implementation will be provided with reference to FIG. 4.

Figure 4:
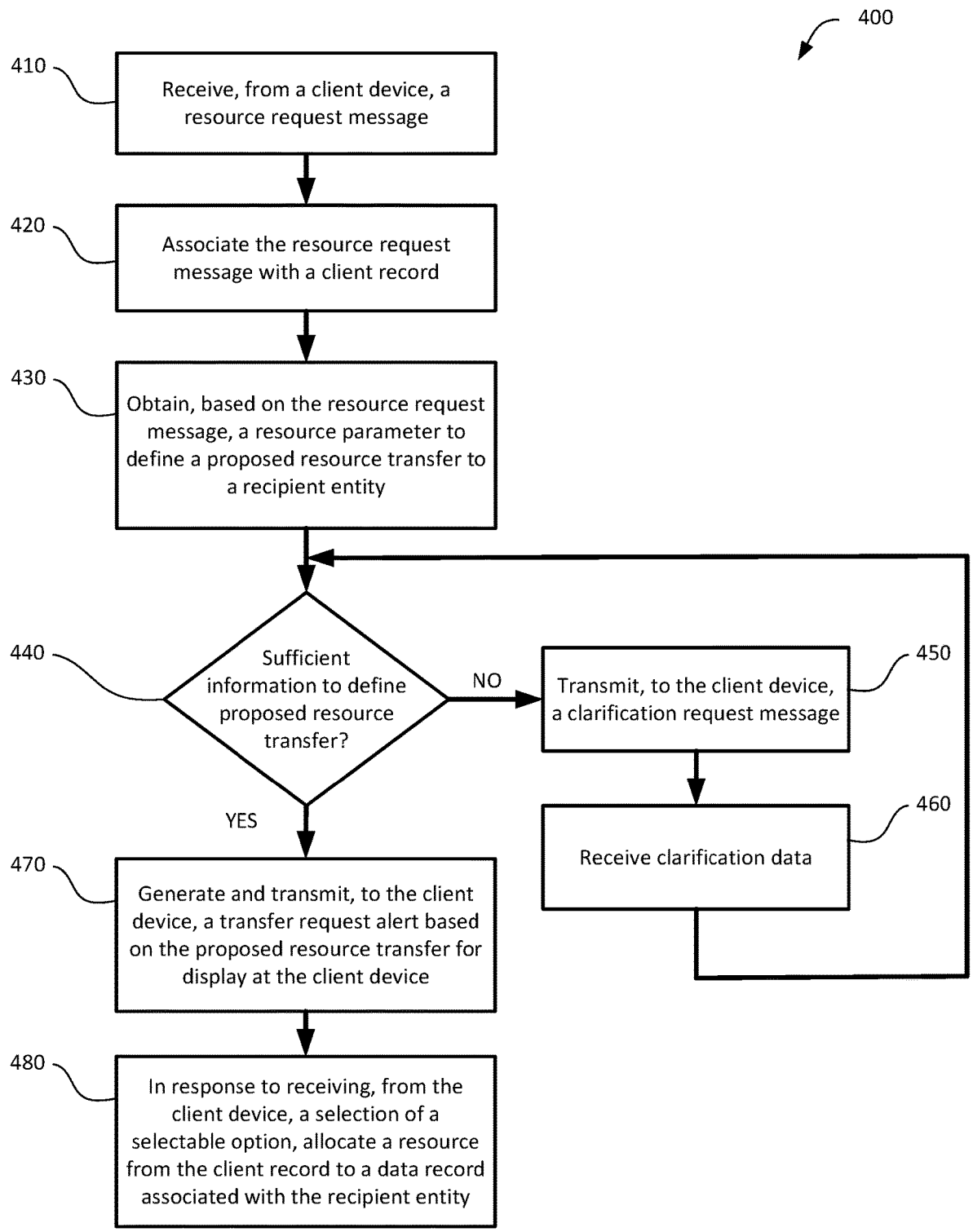
FIG. 4 illustrates, in flowchart form, a method for configuring data transfers based on electronic messages, in accordance with another example of the present application.

Reference is made to FIG. 4, which illustrates, in flowchart form, a method 400 of configuring data transfers based on electronic messages, in accordance with an example of the present application. The method 400 includes operations that may be carried out by one or more processors of the resource server 120 (FIG. 1). For example, the method 400 may be implemented, at least in part, through processor executable instructions associated with the resource management application 122 (FIG. 1). In some examples, one or more operations may be implemented via processor executable instructions in other applications or in an operating system stored and executed on the resource server 120.

At operation 410, the processor receives, from a client device 110 (FIG. 1), a resource request message. The resource request message may be a bill payment notification e-mail.

For instance, a transferor entity of a client device 110 may, via a mobile banking application or an e-mail message application(e.g., exchange application (112) (FIG. 1)), identify and forward a bill payment notification email to an e-mail account associated with the resource server 120. That is, the transferor entity may identify select messages as bill payment notification emails from a plurality of e-mail messages and forward the bill payment notification emails to the resource server 120 for processing.

At operation 420, the processor associates the received resource request message with a client record 126 of the user of the client device 110. For example, when the user of the client device 110 forwards the resource request message to the resource server 120, the resource server 120 may identify from which e-mail address the resource request message was forwarded. The resource server 120 may query the client records 126 and identify a particular client record as being associated with the e-mail address.

At operation 430, the processor obtains a resource parameter to define a proposed resource transfer to a recipient entity. Operation 430 may be similar to operation 340 of FIG. 3. Accordingly, the processor may configure a proposed resource transfer based on the forwarded resource request message, thereby ameliorating a need for the user of the client device 110 to log into an online portal of the recipient entity or to conduct data entry for configuring the proposed resource transfer.

At operation 440, the processor determines whether the obtained resource parameter includes sufficient information to define the proposed resource transfer. It may be appreciated that some recipient entities may generate bill payment notification e-mails with limited information, such that select information may be kept confidential. In example scenarios where a bill payment notification e-mail may not provide a payment amount, the processor may not successfully define a complete proposed resource transfer at least because it may not be clear what quantity of resource is to be transferred.

In the scenario that the processor determines that the obtained resource parameter is insufficient to define the proposed resource transfer, the processor, at operation 450, may generate and transmit a clarification request message to the client device 110 for seeking additional information. For instance, in the scenario where a bill payment notification e-mail omits a payment amount, the clarifying message may request that the user of the client device 110 enter a payment or resource quantity for defining a proposed resource transfer. Other types of additional information sought by the clarifying message may be contemplated. For instance, in the scenario that the user of the client device 110 is associated with multiple banking accounts, the clarifying message may request that the user of the client device 110 identify from which banking account the resource is to be drawn.

At operation 460, the processor may receive a signal representing additional information or clarification data associated with the resource request message and the processor, at operation 440, may determine whether the additional information provides sufficient information to define the proposed resource transfer.

It may be appreciated that operations 440, 450, and 460 for generating/transmitting a clarification request message and receiving a signal representing additional information or clarification data may also be performed in conjunction with operations of the method 300 in FIG. 3.

In response to determining that the obtained resource parameter and/or the additional information associated with the resource request message is sufficient to define a proposed resource transfer, the processor, at operation 470, generates and transmits, to the client device 110, a transfer request alert for display at the client device 110. Operation 470 may be similar to operation 350 of FIG. 3. The transfer request alert may include values defining the proposed resource transfer to the recipient entity and may include a user interface element for receiving input from the user of the client device 110. For example, the user interface element may be a "confirm" or "authorize" user interface element for receiving confirmation that the transferor entity approves of the transfer.

In response to receiving, from the client device, a selection of the selectable option, the processor, at operation 480, allocates a resource associated with the resource parameter from the client record 126 of the user of the client device 110 to a data record associated with the recipient entity. Operation 480 may be similar to operation 360 of FIG. 3.

In some examples, prior to allocating the resource from the client record 126 of the transferor entity to a data record of the recipient entity, the processor may receive, from the client device 110, an authentication indication of the user via the non-messaging application (e.g., mobile banking application). That is, an additional security measure may be implemented prior to settling the resource allocation. In some scenarios, the processor may receive a biometric input associated with the client record in addition to a signal representing selection of a "confirm" user interface. Other types of authentication indications, such as passcodes, may be contemplated. It may be appreciated that the operations for receiving an authentication indication as an additional security measure may be performed in conjunction with the operations of method 300 of FIG. 3, the operations of method 400 of FIG. 4, or any other methods described herein.

Figure 5:
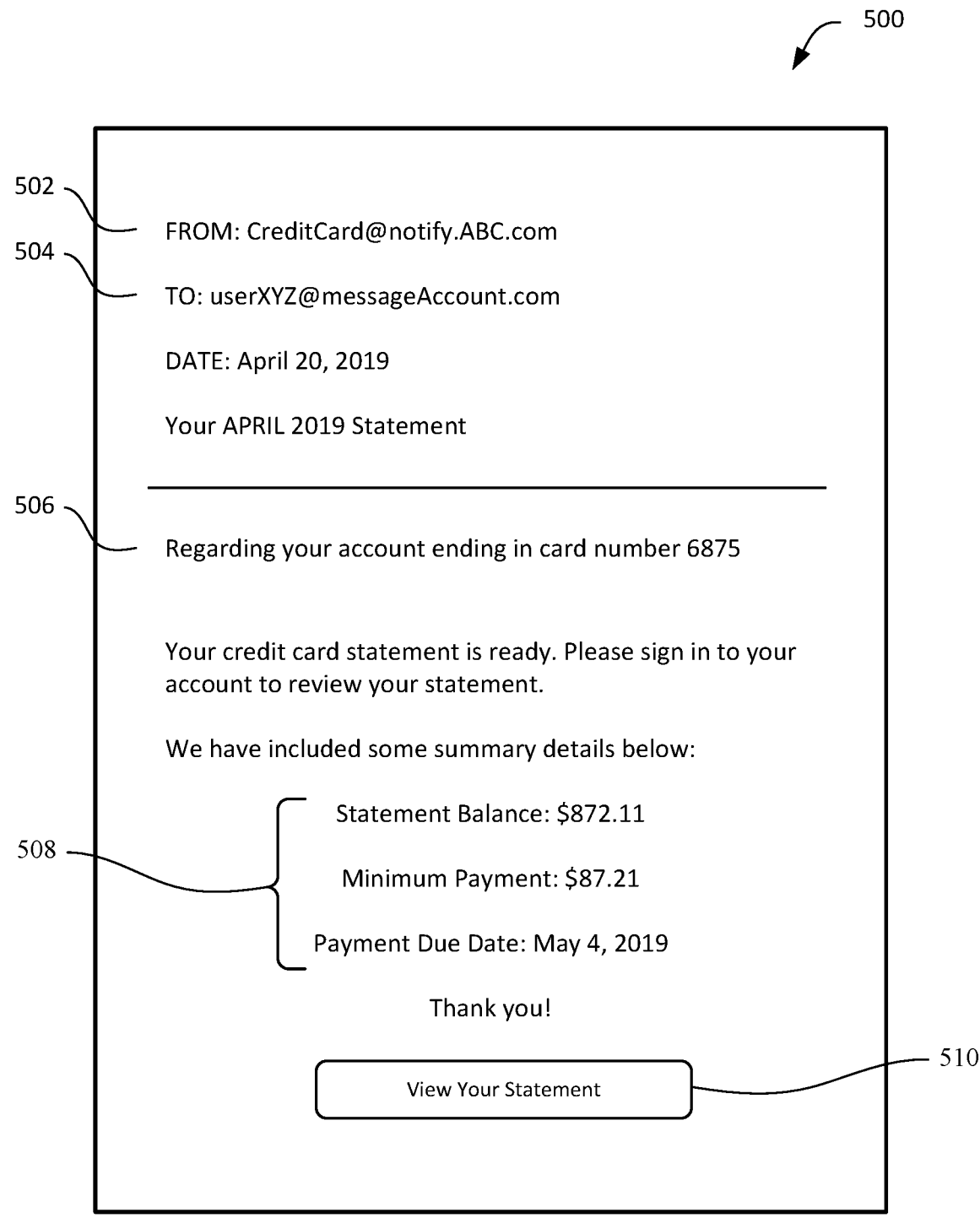
FIG. 5 diagrammatically illustrates a bill payment notification e-mail, in accordance with an example of the present application.

Reference is made to FIG. 5, which diagrammatically illustrates a bill payment notification e-mail 500, in accordance with an example of the present application. The bill payment notification e-mail 500 may be an example of a resource request message described herein. For instance, the bill payment notification e-mail 500 may be an example resource request message described with reference to FIG. 3.

The bill payment notification e-mail 500 may include a recipient entity e-mail address 502. The resource server 120 may conduct operations, such as optical character recognition (OCR), to identify the e-mail address "creditcard@notify.capitalone.com" and associate the e-mail address with a recipient entity that may be included in a payee list stored at the resource server 120.

The bill payment notification e-mail 500 may include a transferor entity e-mail address 504. The transferor entity e-mail address 504 may be associated with a message account that the resource server 120 has delegated access to query.

The bill payment notification e-mail 500 may also include a portion of an account number 506 associated with the transferor entity. The account number may be assigned by the recipient entity. In FIG. 5, the bill payment notification e-mail 500 may specify that the notification email is associated with a credit card account ending in 6875. In some examples, the resource server 120 may utilize account number information to associate the bill payment notification e-mail 500 with a client record 126. That is, the client record 126 may include a payee list having account number information. When the resource server 120 identifies the account number information, the resource server 120 may make the association with the client record 126.

The bill payment notification e-mail 500 may include a set of values that may collectively be identified as a resource parameter 508. For example, the resource parameter 508 may include a statement balance amount, a minimum payment amount, and a payment due date. In some examples, the resource server 120 may conduct optical character recognition operations to identify the set of values for defining a proposed resource transfer.

In some examples, the bill payment notification e-mail 500 may include a selectable user interface element 510 for re-directing the user of the client device 110 to an online portal of the recipient entity. It may be appreciated that the user of the client device 110 may access the online portal for detailed information of the example credit card statement. However, the systems and methods described herein may define a proposed resource transfer based on an identified resource request message (e.g., bill payment notification e-mail 500), thereby ameliorating the additional operations needed to access a detailed credit card statement and configuring a payment.

Figure 6:
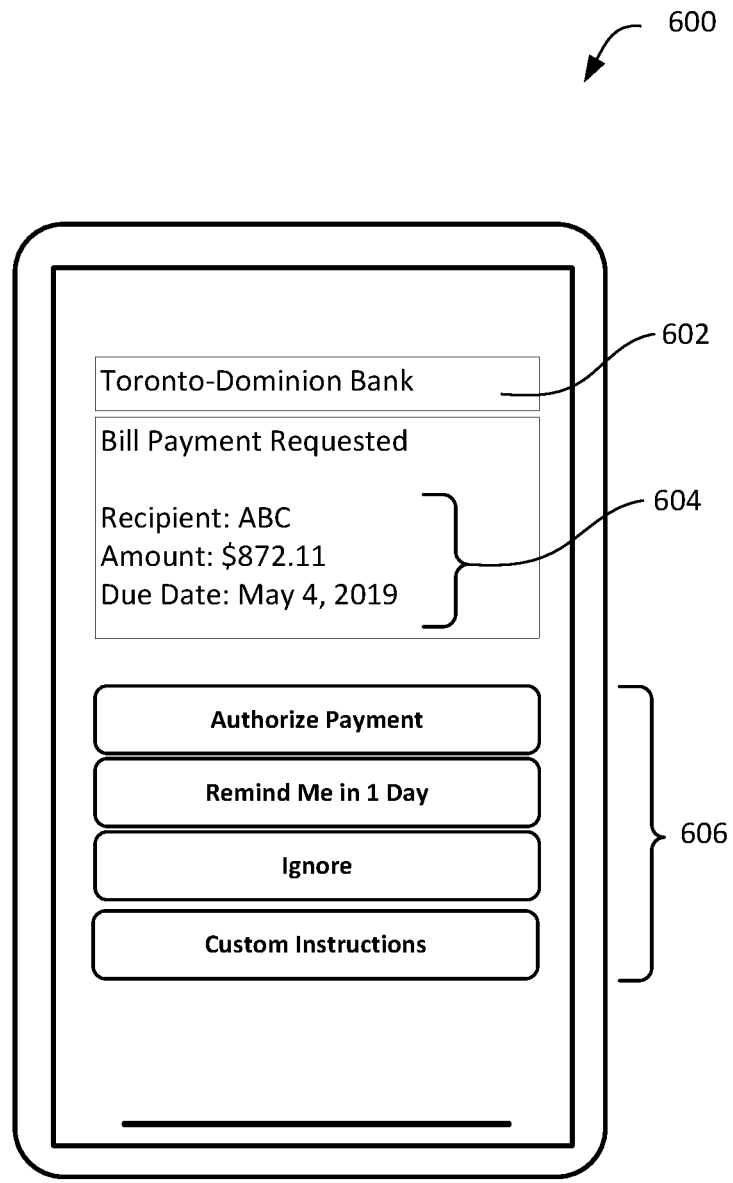
FIG. 6 diagrammatically illustrates a user interface including a transfer request alert, in accordance with an example of the present application.

Reference is made to FIG. 6, which diagrammatically illustrates a user interface including a transfer request alert 600 displayed on an output module of the client device 110, in accordance with an example of the present application. The example transfer request alert 600 may be an example transfer request alert described with reference to FIG. 3.

The transfer request alert 600 may include a textual field 602 identifying that the transfer request alert 600 is associated with the exchange application 112 of the Toronto-Dominion Bank that is operating on the client device 110. Further, the transfer request alert 600 may include a resource parameter 604. The resource parameter 604 may describe a collection of parameters including a recipient identifier, a payment amount, and/or a payment due date.

Further, the transfer request alert 600 may include one or more selectable options 606 for receiving input from the user of the client device 110. For example, the transfer request alert 600 illustrated in FIG. 6 includes an "Authorize Payment" user interface element for receiving confirmation that the user of the client device 110 approves the proposed resource transfer to the recipient entity. The transfer request alert 600 may include a "Remind me in 1 day" user interface element for receiving an instruction from the user to delay action relating to the proposed resource transfer. The transfer request alert 600 may include an "Ignore" user interface element for receiving an instruction from the user to take no action on the proposed resource transfer. For instance, the user may desire to take no action in the event that the resource server 120 may have erroneously identified an e-mail to be a resource request message. In another example, the transfer request alert 600 may include other custom user interface elements for receiving user-defined instructions associated with the proposed resource transfer. Other user interface elements for receiving user input may be contemplated.

Figure 7:
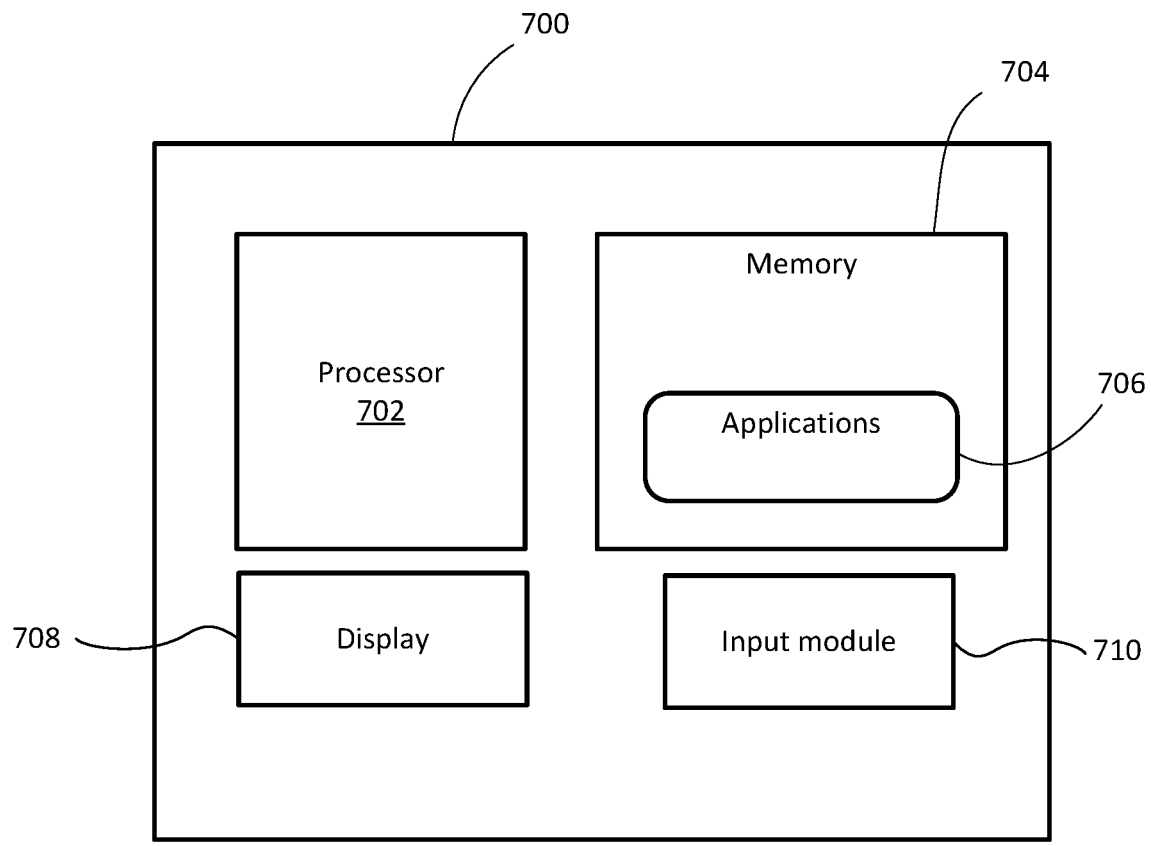
FIG. 7 illustrates, in simplified block diagram form, an electronic device, in accordance with an example of the present application.

Reference is made to FIG. 7, which illustrates, in simplified block diagram from, an electronic device 700, in accordance with an example of the present application. The electronic device 700 may be the client device 110 or the recipient device 140 of FIG. 1. The electronic device 700 includes one or more processors 702, memory 704, and a communication module for providing network capabilities to communicate with other computing devices. The memory 704 may store processor executable software applications 706 that include an operating system to provide basic device operations. The software applications 706 may also include instructions implementing operations of the methods described herein.

The electronic device 700 includes a display interface and/or a display 708. The display 708 may be any suitable display such as a liquid crystal display (LCD), an e-ink/e-paper display, or the like. In some examples, the display 708 is a touchscreen display. The electronic device 700 includes an input module 710 for receiving signals representing commands described in examples herein. In some examples, the input module 710 may be a keyboard device, a touch input device, or a microphone for receiving natural language input from a user of the electronic device 700. In some examples, the electronic device 700 may be a portable electronic device, such as a smartphone, a personal computer, a personal digital assistant, a portable navigation device, a mobile phone, a wearable computing device (e.g., smart watch, wearable activity monitor, or the like), or any other type of computing device that may be configured to store data and software instructions, and execute software instructions to perform example operations described herein.

Figure 8:
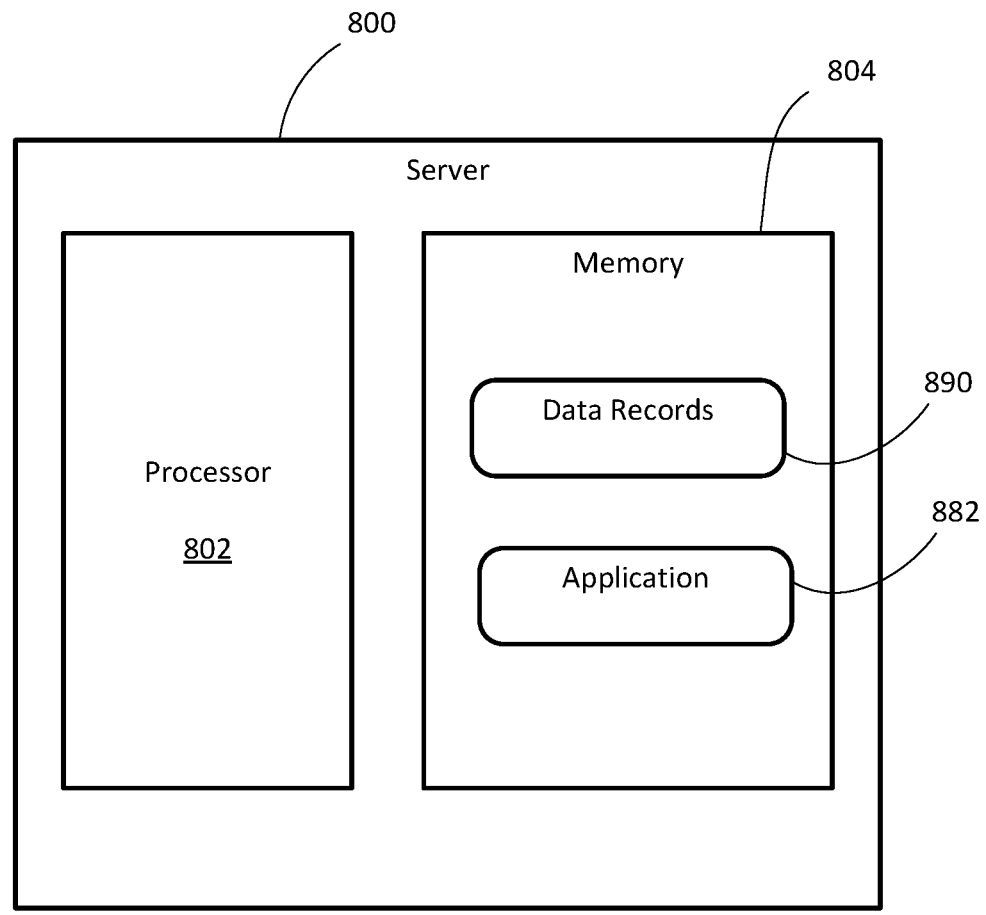
FIG. 8 illustrates, in simplified block diagram form, a server, in accordance with an example of the present application.

Reference is made to FIG. 8, which illustrates, in simplified block diagram form, a server 800, in accordance with an example of the present application. The server 800 may be the resource server 120 or the message server 130 of FIG. 1. The server 800 includes one or more processors 802, memory 804, and a communications module for providing network capabilities to communicate with other computing devices. The memory 804 may include data records 890. In the example of the resource server 120, the data records 890 may include the resource records 124 or the client records 126 of FIG. 1. In the example of the message server 130, the data records 890 may be the account records 134 of FIG. 1.

The memory 804 may also include applications 882 having instructions for performing operations described herein. In an example of the resource server 120, the applications 882 may include may include the resource management application 122 of FIG. 1. In an example of the message server 130, the applications 882 may include the mail application 132 of FIG. 1.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A resource server comprising:
a communication module;
a processor coupled to the communication module; and
a memory coupled to the processor, the memory storing instructions that, when executed, configure the processor for:
receiving, from a client device, an authentication credential including an OAuth token for querying keywords or expressions within a plurality of messages of a message account associated with a user of the client device;
associating the authentication credential with a client record of the user of the client device;
regulating frequencies of performing message scan operations for different recipients by prioritizing message scan operations to identify, by conducting optical character recognition and based on delegated access to query the message account at a message server using the authentication credential including the OAuth token, a first resource request message from a frequently paid recipient and corresponding to a bill payment notification among a plurality of messages associated with the message account using a defined keyword or expression criteria based on a list of domain names sorted by payment frequency, wherein a new domain name associated with the first resource request message is added to the list of domain names associated with the client record when not in the list of domain names, wherein a time stamp is recorded in the client record in relation to the frequently paid recipient when identifying the first resource request message and the recorded time stamp establishes a baseline threshold for a future message scan corresponding to the frequently paid recipient;
obtaining, by the optical character recognition and based on the first resource request message, a resource parameter to define a proposed resource transfer to a recipient entity;
generating and transmitting, to the client device, a first transfer request alert based on the defined proposed resource transfer for display on a non-messaging application interface at the client device, wherein the first transfer request alert includes the obtained resource parameter and a selectable option that includes a user interface element for confirming the defined proposed resource transfer;
receiving, from the client device, an authentication indication of the user via the non-messaging application;
in response to receiving, from the client device, a selection of the selectable option to confirm the defined proposed resource transfer and after receiving the authentication indication, allocating a resource associated with the resource parameter from the client record to a data record associated with the recipient entity, wherein the allocating of the resource includes delaying, for cash flow planning, and based on a scheduling criteria defined by a cash threshold availability preference included in the client record, allocation of the resource until a date nearer to a due date associated with the first resource request message; and after a period of time, conducting a subsequent message scan operation to identify a second resource request message from a next less frequently paid recipient.

2. The system of claim 1, wherein the client record includes a user preference defining a transfer amount criteria including at least one of a full amount, a percentage amount, and a minimum amount, and wherein the allocating of the resource includes allocating the resource based on the transfer amount criteria.

3. The system of claim 1, wherein the defined criteria includes a recipient name associated with a list of geographically grouped recipients for identifying the first resource request message.

4. The system of claim 1, wherein identifying the first resource request message includes identifying that a message includes an account number of an entity included in an existing recipient list associated with the client record.

5. The system of claim 1, wherein the client record includes the cash threshold availability preference defining that any proposed resource transfer shall not cause an account associated with the client record to decrease below a threshold amount, and wherein the allocating of the resource includes allocating the resource based on the threshold amount.

6. The system of claim 1, wherein the selectable option is based on current available resources associated with the client record.

7. A computer-implemented method for providing notifications of resource request messages, the method comprising:

receiving, from a client device, an authentication credential including an OAuth token for querying keywords or expressions within a plurality of messages of a message account associated with a user of the client device;

associating the authentication credential with a client record of the user of the client device;

regulating frequencies of performing message scan operations for different recipients by prioritizing message scan operations to identify, by conducting optical character recognition and based on delegated access to query the message account at a message server using the authentication credential including the OAuth token, a first resource request message from a frequently paid recipient and corresponding to a bill payment notification among a plurality of messages associated with the message account using a defined keyword or expression criteria based on a list of domain names sorted by payment frequency, wherein a new domain name associated with the first resource request message is added to the list of domain names associated with the client record when not in the list of domain names, wherein a time stamp is recorded in the client record in relation to the frequently paid recipient when identifying the first resource request message and the recorded time stamp establishes a baseline threshold for a future message scan corresponding to the frequently paid recipient;

obtaining, by the optical character recognition and based on the first resource request message, a resource parameter to define a proposed resource transfer to a recipient entity;

generating and transmitting, to the client device, a first transfer request alert based on the defined proposed resource transfer for display on a non-messaging application interface at the client device, wherein the first transfer request alert includes the obtained resource parameter and a selectable option for confirming the defined proposed resource transfer;

receiving, from the client device, an authentication indication of the user via the non-messaging application;

in response to receiving, from the client device, a selection of the selectable option that includes a user interface element for confirming the defined proposed resource transfer and after receiving the authentication indication, allocating a resource associated with the resource parameter from the client record to a data record associated with the recipient entity, wherein the allocating of the resource includes delaying, for cash flow planning, based on a scheduling criteria defined by a cash threshold availability preference included in the client record, allocation of the resource until a date nearer to a due date associated with the resource request message; and after a period of time, conducting a subsequent message scan operation to identify a second resource request message from a next less frequently paid recipient.

8. The method of claim 7, wherein the client record includes a user preference defining a transfer amount criteria including at least one of a full amount, a percentage amount, and a minimum amount, and wherein the allocating of the resource includes allocating the resource based on the transfer amount criteria.

9. A non-transitory computer-readable storage medium storing instructions for providing notifications of resource request messages, the instructions, when executed by a processor of a computing device, cause the computing device to:

receive, from a client device, an authentication credential including an OAuth token for querying keywords or expressions within a plurality of messages of a message account associated with a user of the client device;

associate the authentication credential with a client record of the user of the client device;

regulating frequencies of performing message scan operations for different recipients by prioritizing message scan operations to identify, by conducting optical character recognition and based on delegated access to query the message account at a message server using the authentication credential including the OAuth token, a first resource request message from a frequently paid recipient and corresponding to a bill payment notification among a plurality of messages associated with the message account using a defined keyword or expression criteria based on a list of domain names sorted by payment frequency, wherein a new domain name associated with the first resource request message is added to the list of domain names associated with the client record when not in the list of domain names, wherein a time stamp is recorded in the client record in relation to the frequently paid recipient when identifying the first resource request message and the recorded time stamp establishes a baseline threshold for a future message scan corresponding to the frequently paid recipient;

obtain, by the optical character recognition and based on the first resource request message, a resource parameter to define a proposed resource transfer to a recipient entity;

generate and transmit, to the client device, a first transfer request alert based on the defined proposed resource transfer for display on a non-messaging application interface at the client device, wherein the first transfer request alert includes the obtained resource parameter and a selectable option that includes a user interface element for confirming the defined proposed resource transfer;

receive, from the client device, an authentication indication of the user via the non-messaging application;

in response to receiving, from the client device, a selection of the selectable option to confirm the defined proposed resource transfer and after receiving the authentication indication, allocate a resource associated with the resource parameter from the client record to a data record associated with the recipient entity, wherein the allocating of the resource includes delaying, for cash flow planning, based on a scheduling criteria defined by a cash threshold availability preference included in the client record, allocation of the resource until a date nearer to a due date associated with the resource request message; and after a period of time, conduct a subsequent message scan operation to identify a second resource request message from a next less frequently paid recipient.

* * * * *